Feb. 12, 1929.
F. B. HEWEL
1,701,673
ATTACHMENT FOR PORTABLE DRILLS
Filed April 7, 1924
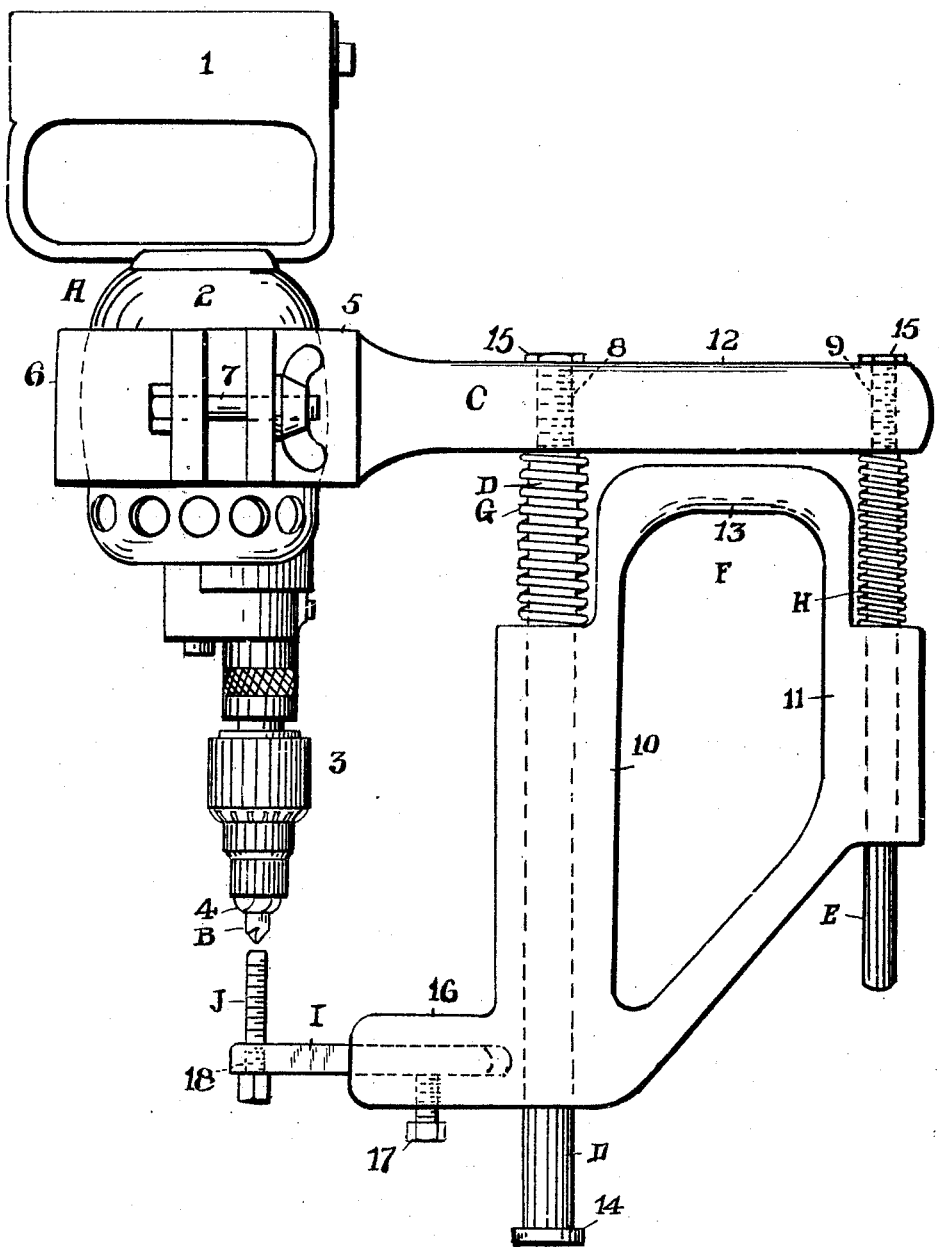
INVENTOR
Frank B. Hewel,
by Edward A. Lawrence,
his attorney.

Patented Feb. 12, 1929.

1,701,673

UNITED STATES PATENT OFFICE.

FRANK B. HEWEL, OF PITTSBURGH, PENNSYLVANIA.

ATTACHMENT FOR PORTABLE DRILLS.

Application filed April 7, 1924. Serial No. 704,665.

My invention consists in a new and improved attachment for portable drills.

While my invention is applicable to various drilling operations, its particular or chief object is the provision of means applicable to portable drills for facilitating the drilling and countersinking of rivet holes in brake linings, such as linings for the brakes of motor vehicles.

The present method of lining or relining brakes is as follows. The lining is temporarily attached in place on the metallic brake band as by means of clamps, and the rivet holes are then drilled through the lining and the outer ends of the holes countersunk. Owing to the necessity of countersinking the holes in the lining, to receive the heads of the rivets and prevent the latter from contacting with the drum or other braking surface, the holes must be drilled through from the exposed face of the lining. It is therefore difficult, and indeed, except by the use of considerable skill and care, impossible to accurately register the holes in the lining with the rivet holes in the band. The result is that when the rivets are installed the brake lining does not fit smooth and flat, impairing the braking action and causing uneven wear.

My improved drill attachment insures the positioning of the holes in the brake lining in accurate registration with the holes in the brake band, so that when the lining is riveted in position, it is smooth and flat on the band.

Generally speaking my improved attachment comprises a bracket or support which is removably mounted on the portable drill, and upon which bracket is slidably mounted a frame which carries a centering pin alined with the drill bit and movable toward or away therefrom.

When a hole is to be drilled in a brake lining temporarily mounted on its band, the centering pin is inserted into the hole in the band from the surface thereof opposite to that against which the lining is placed, and as the drill is operated the centering pin is compressed toward the drill.

Resilient means are provided tending to separate the centering pin and the drill bit, and the workman compresses said means by grasping with his hand opposed grips on the support and the frame.

Means are provided for adjusting the position of the centering pin relative to the drill bit, to accommodate varying thicknesses or character of work.

Means are also provided for adjusting the centering pin on the frame to accommodate the attachment to different characters of portable drills.

Other novel features of construction and arrangement of parts will appear from the following description.

In the accompanying drawings, I have shown in side elevation a drill attachment, embodying the principles of my invention, applied to a portable electric drill.

Thus A represents a portable electric drill having a hand grip 1, a motor casing 2, and a chuck 3. B is the drill bit clamped in the chuck and having a countersink 4.

C represents a support or bracket extending laterally from the drill and detachably mounted thereon in any convenient manner. Thus I have shown the bracket provided at its inner end with a yoke 5 which bears against the casing 2 at one side and is clamped to the curved strap 6, which bears against the opposite side of the casing 2, by connecting bolts 7.

The bracket C is provided with two spaced apart threaded holes 8 and 9 in which are screwed the threaded ends of guide rods D and E which depend parallel with the axis of the drill A.

F is an open frame which is provided with parallel sleeves 10 and 11 through which the rods D and E extend. Thus the frame F is slidably mounted on the bracket C. Resilient means, such as the helical springs G and H coiled about the rods D and E between the bracket C and the frame F, tend to force the frame away from the bracket. The bracket is provided with a rounded portion 12 which forms a hand grip opposed to a similar hand grip 13 on the frame F, so that by grasping the two hand grips with his hand the workman may cause the same to approach, by compressing the springs. When the workman relaxes his hand, the frame will automatically retreat from the bracket.

Means are provided for limiting the retreat of the frame F from the bracket C. Thus I have shown the free end of the rod D provided with an enlarged head 14. 15 represents thin nuts screwed on the other ends of the rods D and E against the bracket C to lock the rods against rotation.

The lower or outer end of the frame F is provided with a socket 16 extending toward the axial line of the drill. I is a bar whose end is inserted in said socket and which is lockable therein, as by the set screw 17. The socket and bar are preferably non-circular to prevent rotation of the bar. It is evident that by shifting the bar longitudinally of the socket, its position therein may be nicely adjusted.

The outer end of the bar I is provided with a transversely disposed, threaded hole 18 in which is screwed the threaded centering pin J which by the adjustment of the bar I in the socket 16 is positioned in accurate alinement with the drill B.

When a hole is to be drilled in a brake lining in position on the band, the centering pin J is inserted into the hole in the band from the back or unlined surface thereof; the drill is started and the workman grasps the hand grips 12 and 13 and draws them gradually together so that the drill B is brought into contact with the lining at a point alined with the centering pin J and also with the axis of the hole in the brake band, and the hole is drilled through the lining in accurate registration with the hole in the band, the countersink 4 reaming out the outer end of the hole in the lining to receive the head of the rivet. When the hole is properly drilled and countersunk, the workman relaxes his hand and the centering pin is retracted, and the band and lining may be shifted to the proper position for forming the next holes.

It is evident that the holes in the lining may thus be rapidly and accurately formed by even an unskilled workman, and the linings when riveted to the bands will fit smooth and flat thereon.

What I desire to claim is:—

1. In combination with an electric hand drill provided with a hand grip, a frame provided with a pair of parallel sleeves, a bracket fixedly secured to the drill and extending to one side thereof, a pair of guide-rods fixed to said bracket and slidably engaging said sleeves, said guide-rods being disposed in parallelism with the axis of the drill whereby the drill is operatively disposed to one side of the frame and said bracket being provided with a hand grip between said rods, helical springs coiled about said guide-rods between said bracket and said frame, and a centering pin carried by said frame and opposed to and alined with the drill bit.

2. In combination with an electric hand drill, an open frame provided with a pair of parallel sleeves, a bracket rigidly secured to the drill and extending to one side thereof, guide-rods fixed to said bracket and slidably engaging said sleeves, said guide rods being disposed in parallelism with the axis of the drill whereby the drill is operatively disposed to one side of the frame, a helical spring coiled about said guide-rods between said bracket and said frame so as to resiliently separate the same, a centering pin carried by said frame and opposed to the drill bit, and means for alining the centering pin with the drill bit.

3. In combination with an electric hand drill, a frame provided with a pair of parallel sleeves, a bracket fixedly secured to the drill and extending to one side thereof, said drill and said bracket being provided with hand grips, guide-rods fixed to said bracket and slidably engaging said sleeves, said guide-rods being disposed in parallelism with the axis of said drill whereby the drill is operatively disposed to one side of the frame, a helical spring coiled about said guide-rods between said bracket and said frame, a centering pin carried by said frame and opposed to the drill bit, and means for alining the centering pin with the drill bit.

4. In combnation with an electric hand drill provided with a hand grip, a frame provided with a pair of parallel sleeves, a bracket fixedly secured to the drill and extending to one side thereof, a pair of guide-rods fixed to said bracket and slidably engaging said sleeves, said guide-rods being disposed in parallelism with the axis of the drill whereby the drill is operatively disposed to one side of the frame and said bracket being provided with a hand grip between said rods, helical springs coiled about said guide-rods between said bracket and said frame, a centering pin carried by said frame and opposed to the drill bit, and means for alining the centering pin with the drill bit.

5. In combination with an electric hand drill, a bracket secured to the drill and extending to one side thereof, an open frame adjacent the bracket provided with parallel sleeves on either side thereof and having a hand gripping portion, guide-rods fixed to said bracket and slidably engaging said sleeves, said guide-rods being disposed in parallelism with the axis of the drill, helical springs coiled about said guide-rods between said bracket and said frame so as to resiliently separate the same, and a centering pin carried by said frame and opposed to and alined with the drill bit.

6. In combination with an electric hand drill, a bracket secured to the drill and extending to one side thereof, an open frame adjacent the bracket provided with sleeves, said drill and said bracket being provided with hand grips, guide-rods fixed to said bracket and slidably engaging said sleeves, said guide-rods being disposed in parallelism with the axis of said drill whereby the drill is operatively disposed to one side of the frame, helical springs coiled about said guide-rods between said bracket and said frame, and a centering pin opposed to and alined with the drill bit.

Signed at Pittsburgh, Pa., this 24th day of March, 1924.

FRANK B. HEWEL.